US011416647B2

(12) United States Patent
Vernon (10) Patent No.: US 11,416,647 B2
(45) Date of Patent: *Aug. 16, 2022

(54) COMPUTER-AIDED DESIGN FILE FORMAT FOR ADDITIVE MANUFACTURING AND METHODS OF FILE GENERATION

(71) Applicant: HONEYWELL FEDERAL MANUFACTURING & TECHNOLOGIES, LLC, Kansas City, MO (US)

(72) Inventor: Gregory John Vernon, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 451 days.

This patent is subject to a terminal disclaimer.

(21) Appl. No.: 15/961,156

(22) Filed: Apr. 24, 2018

(65) Prior Publication Data

US 2019/0325111 A1  Oct. 24, 2019

(51) Int. Cl.
*G06F 30/17* (2020.01)
*G06F 17/16* (2006.01)
(Continued)

(52) U.S. Cl.
CPC .......... *G06F 30/17* (2020.01); *G06F 16/116* (2019.01); *G06F 17/16* (2013.01); *G06F 30/23* (2020.01)

(58) Field of Classification Search
CPC ........ G06F 30/17; G06F 16/116; G06F 17/16; G06F 30/23
(Continued)

(56) References Cited

U.S. PATENT DOCUMENTS 8,175,734 B2 * 5/2012 Fogel ..................... B33Y 50/00
                                                        700/98
8,405,655 B2 * 3/2013 Onodera ................. G06T 17/00
                                                        703/2
(Continued)

FOREIGN PATENT DOCUMENTS

EP           0668572        8/1995
WO    WO-2019050519 A1 *   3/2019   ............ G06F 30/00

OTHER PUBLICATIONS

Brown_2013 (Additive Manufacturing Technical Workshop Summary Report, NIST Technical Note 1823, U.S. Department of Commerce, Nov. 2013) (Year: 2013).*
(Continued)

*Primary Examiner* — Brian S Cook
(74) *Attorney, Agent, or Firm* — Hovey Williams LLP (57) ABSTRACT

A method of generating a tessellated output file comprising receiving a computer-aided design (CAD) model file defining a CAD model including a plurality of vertices, a plurality of curves, a plurality of surfaces, and at least one volume; generating base polygon data defining the CAD model for additive manufacturing, the base polygon data including a plurality of connected polygons, each polygon including a plurality of nodes, a plurality of edges, and a face; generating data for a vertex metadata container including a listing of CAD model vertices and one polygon node associated with each CAD model vertex; generating data for a curve metadata container including a listing of CAD model curves and at least one polygon edge associated with each CAD model curve; and generating data for a surface metadata container including a listing of CAD model surfaces and at least one polygon face associated with each CAD model surface.

20 Claims, 7 Drawing Sheets

(51) Int. Cl.
    *G06F 16/11*    (2019.01)
    *G06F 30/23*    (2020.01)
(58) Field of Classification Search
    USPC .............................................................. 703/2
    See application file for complete search history.

(56)             References Cited

U.S. PATENT DOCUMENTS

| | | | |
|---|---|---|---|
| 10,363,732 B2* | 7/2019 | Vernon | ................... B33Y 50/00 |
| 2003/0191554 A1 | 10/2003 | Russell et al. | |
| 2006/0094951 A1 | 5/2006 | Dean et al. | |
| 2006/0098008 A1 | 5/2006 | Holberg | |
| 2006/0139348 A1 | 6/2006 | Harada et al. | |
| 2010/0053170 A1 | 3/2010 | Alonso et al. | |
| 2010/0087939 A1* | 4/2010 | Sims, Jr. | ................... G06F 30/00 |
| | | | 700/98 |
| 2011/0199382 A1* | 8/2011 | Huang | .................... G06T 9/001 |
| | | | 345/467 |
| 2012/0206457 A1 | 8/2012 | Crocker | |
| 2014/0184598 A1 | 7/2014 | Quilot et al. | |

OTHER PUBLICATIONS

3MF_CORE Specification & Reference Guide (2018) (Year: 2018).*
International Search Report and Written Opinion for Intl. Appln. No. PCT/US2019/028505; Intl Filing Date Apr. 22, 2019; and all references cited therein.
Wulf, Armin, The CGNS System Standard for Aerodynamic Data, Jan. 13, 1999.

* cited by examiner

| CURVE: 1 | | |
|---|---|---|
| GLOBAL NODES IN CURVE | CURVE U-PARAMETER | CURVE LOCAL-NODE ORDER |
| [0,2,5] | 0 | 3 |
| | 0.5 | 2 |
| | 1. | 1 |

FIG. 7

| CURVE: 1 | |
|---|---|
| CURVE U-PARAMETER | CURVE GLOBAL-NODE ID |
| 0. | 5 |
| 0.5 | 2 |
| 1. | 0 |

COMPUTER-AIDED DESIGN FILE FORMAT FOR ADDITIVE MANUFACTURING AND METHODS OF FILE GENERATION

STATEMENT REGARDING FEDERALLY-SPONSORED RESEARCH OR DEVELOPMENT

This invention was made with government support under Contract No.: DE-NA0000622 awarded by the Department of Energy. The government has certain rights in the invention.

BACKGROUND OF THE INVENTION

Field of the Invention

Embodiments of the current invention relate to formats of computer-aided design (CAD) output files used for additive manufacturing and methods of generating the files.

Description of the Related Art

Additive manufacturing (AM) machines, such as 3D printers, create three-dimensional objects, such as mechanical components, subsystems, or systems, medical or dental products, artistic creations, and the like, based on computer-aided design (CAD) models. The CAD model may be created (using CAD software) by a designer, engineer, or artist and typically includes information about the structure of the object, such as shape and/or size, connectivity, and the like, as well as attributes such as materials used, colors, and so forth. When the CAD model is ready for printing, an output file may be generated that defines the CAD model in terms from which an AM machine can create the object. The output file may include definitions for the shape and/or size of the object and may be generated by defining each of the surfaces of the object as a plurality of interconnected surface points which approximate the shape of the surfaces. A widely-used format for the output file is the stereolithography (STL) format, also known as standard triangle language or standard tessellation language, which defines the surfaces of the object as a plurality of interconnected surface points that form triangles. Accordingly, the output file includes a list of three-dimensional coordinates of surface points that are the vertices of the triangles which approximate the shape of the surfaces. The drawbacks to the STL file format include a potential lack of "watertightness" (meaning that the object formed may have unintended openings or gaps between surfaces), an inability to associate metadata, and an inability to reconstruct the original CAD model from the output file.

SUMMARY OF THE INVENTION

Embodiments of the current invention solve the above-mentioned problems and provide a distinct advance in the art of formats of computer-aided design (CAD) output files used for additive manufacturing and methods of generating the files. The CAD output file is a tessellated output file which includes mesh geometry data that may be utilized in additive manufacturing but also includes metadata that allows an original CAD model to be recreated from the output file. One method of generating the tessellated output file comprises receiving a computer-aided design (CAD) model file from a CAD software application, the CAD model file defining a CAD model including a plurality of vertices, a plurality of curves, a plurality of surfaces, and at least one volume; generating base polygon data that defines the CAD model for additive manufacturing, the base polygon data including a plurality of connected polygons, each polygon including a plurality of nodes, a plurality of edges, and a face; generating data for a vertex metadata container including a listing of CAD model vertices and one polygon node associated with each CAD model vertex; generating data for a curve metadata container including a listing of CAD model curves and at least one polygon edge associated with each CAD model curve; and generating data for a surface metadata container including a listing of CAD model surfaces and at least one polygon face associated with each CAD model surface.

Another embodiment of the current invention provides a method of generating a tessellated output file comprising receiving a computer-aided design (CAD) model file from a CAD software application, the CAD model file defining a CAD model including a plurality of vertices, a plurality of curves, a plurality of surfaces, and at least one volume; generating base polygon data that defines the CAD model for additive manufacturing, the base polygon data including a plurality of connected polygons, each polygon including a plurality of nodes, a plurality of edges, and a face; generating data for a vertex metadata container including a listing of CAD model vertices and one polygon node associated with each CAD model vertex; generating data for a curve metadata container including a listing of CAD model curves and at least one polygon edge associated with each CAD model curve; generating data for a surface metadata container including a listing of CAD model surfaces and at least one polygon face associated with each CAD model surface; generating data for a volume metadata container including information about material used for the CAD model and the CAD software application kernel; and generating data for a model metadata container including legal information about the CAD model.

Yet another embodiment of the current invention provides a method of generating a tessellated output file comprising receiving a computer-aided design (CAD) model file from a CAD software application, the CAD model file defining a CAD model including a plurality of vertices, a plurality of curves, a plurality of surfaces, and at least one volume; generating base polygon data that defines the CAD model for additive manufacturing, the base polygon data including a plurality of connected polygons, each polygon including a plurality of nodes, a plurality of edges, and a face; generating node data for the base polygon data, the node data including an edge list and a face list; generating edge data for the base polygon data, the edge data including a node list and a face list; generating face data for the base polygon data, the face data including a node list and an edge list; generating data for a vertex metadata container including a listing of CAD model vertices and one polygon node associated with each CAD model vertex; generating data for a curve metadata container including a listing of CAD model curves and at least one polygon edge associated with each CAD model curve; generating data for a surface metadata container including a listing of CAD model surfaces and at least one polygon face associated with each CAD model surface; generating data for a volume metadata container including information about material used for the CAD model and the CAD software application kernel; and generating data for a model metadata container including legal information about the CAD model.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
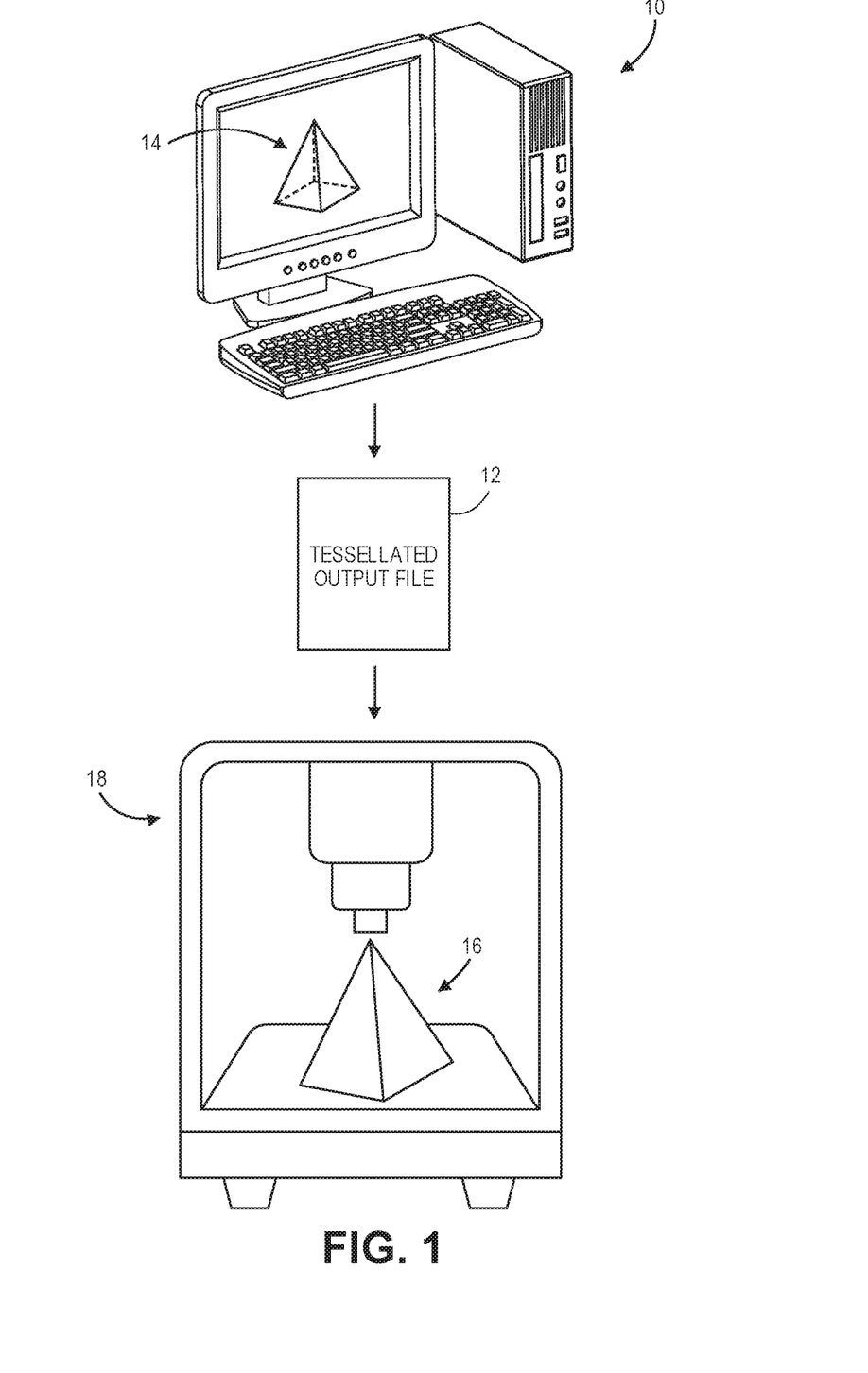
FIG. 1 is an environmental view of a computing device, constructed in accordance with various embodiments of the current invention, for generating a tessellated output file that is communicated to an additive manufacturing machine which creates an object defined in the tessellated output file.

A computing device 10, constructed in accordance with various embodiments of the current invention, for generating a computer-aided design (CAD) tessellated output file 12 is shown in FIG. 1. The computing device 10 is typically embodied by a desktop or workstation computer may also be embodied by server computers, tablet computers, smartphones, or the like. The computing device 10 may execute, run, or implement CAD software that allows a user, such as a designer, engineer, or artist, to create, modify, analyze, and document a CAD model 14 of an actual object 16. The object 16 may be any three-dimensional object, such as a mechanical component, subsystem, or system, a medical or dental product, an artistic creation, etc. The object 16 may include more than one component or subcomponent. The CAD model 14 includes information, such as dimensions, materials used, etc., that describes or defines the object 16 in a format that is proprietary to the CAD software. The tessellated output file 12 describes or defines the CAD model 14, and in turn, the object 16, as an array of tessellated polygons that form a mesh in a format which can be used for additive manufacturing. The tessellated output file 12 is communicated by the computing device 10 to an additive manufacturing (AM) machine 18, which creates the object 16.

Figure 2:
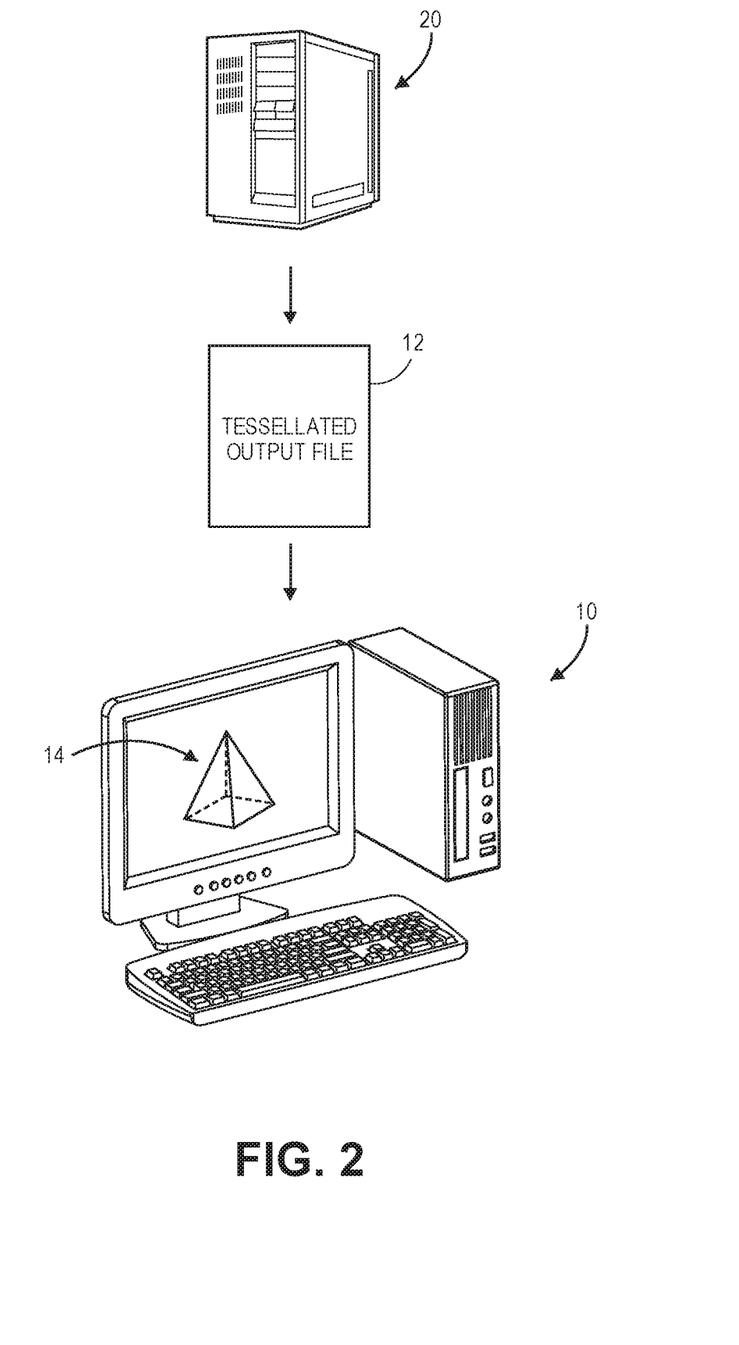
FIG. 2 is an environmental view of the computing device receiving the tessellated output file from a computer server so that the computing device may create a CAD model from the tessellated output file.

In addition, the tessellated output file 12 includes information or metadata about the CAD model 14 in a universal format that is not proprietary to the CAD software which was used to originally create the CAD model 14. Thus, as shown in FIG. 2, the computing device 10 may receive the tessellated output file 12 from another device, such as a computer server 20 or the like, and may recreate the CAD model 14 using the original CAD software or different CAD software.

The AM machine 18 generally forms a structure, such as the object 16, based on the data included in the tessellated output file 12. The object 16 is formed directly from raw material by melting, sintering, or fusing the material point by point and/or layer by layer in an additive fashion—as opposed to starting with a preformed volume of material and removing a portion of the material to form the structure. Examples of the AM machine 18 include 3D printers which utilize raw materials of ceramics, polymers such as nylon or polystyrene, metals such as steel, titanium, aluminum, alloys thereof, and so forth. The operation of the AM machine 18 may be controlled by the computing device 10, or the AM machine 18 may include its own independent controlling device. The computing device 10 may communicate with the AM machine 18 directly or through a communication network such as the Internet.

The server 20 generally retains electronic data and may respond to requests to retrieve data as well as to store data. The server 20 may be embodied by application servers, database servers, file servers, gaming servers, mail servers, print servers, web servers, or the like, or combinations thereof, and may be configured to retain one or more tessellated output files 12.

Figure 3:
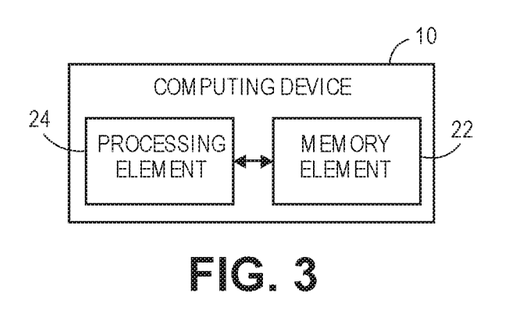
FIG. 3 is a schematic block diagram depicting various electronic components of the computing device.

The computing device 10 may broadly comprise a memory element 22 and a processing element 24, as shown in FIG. 3. The computing device 10 may include additional components such as a display, a user interface including inputs such as a keyboard, a mouse, a touchscreen, or a microphone and outputs such as a speaker, a communication element allowing communication with other devices or systems, and the like, which will not be discussed in detail herein.

The memory element 22 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 22 may be embedded in, or packaged in the same package as, the processing element 24. The memory element 22 may include, or may constitute, a "computer-readable medium". The memory element 22 may store the instructions, code, code statements, code segments, software, firmware, programs, applications, apps, services, daemons, or the like that are executed by the processing element 24. The memory element 22 may also store settings, data, documents, sound files, photographs, movies, images, databases, and the like.

The processing element 24 may include electronic hardware components such as processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 24 may generally execute, process, or run instructions, code, code segments, code statements, software, firmware, programs, applications, apps, processes, services, daemons, or the like. The processing element 24 may also include hardware components such as finite-state machines, sequential and combinational logic, and other electronic circuits that can perform the functions necessary for the operation of the current invention. In various embodiments, the processing element 24 may include multiple computational components and functional blocks that are packaged separately but function as a single unit. The processing element 24 may be in communication with the other electronic components through serial or parallel links that include universal busses, address busses, data busses, control lines, and the like.

The processing element 24 may be operable, configured, or programmed to perform the following functions by utilizing hardware, software, firmware, or combinations thereof. The processing element 24 and the memory element 22 receive the CAD model file that defines the CAD model 14. The CAD model file may be received from any one of a plurality of other computing devices or electronic devices, such as the ones shown in FIGS. 1 and 2, and may be stored in the memory element 22. In some embodiments, the CAD model file may be generated by the computing device 10 itself. The CAD model file is typically created by a CAD software application used for creating and defining models of three-dimensional objects, such as the object 16. The CAD software application utilizes a set of instructions or algorithms, known as a kernel, to create the CAD model 14, which may include information about the object 16, such as a shape, a size, dimensions, number and type of subcomponents, materials used to form the object 16, one or more colors of the object 16, surface finishes, and so forth. The CAD model 14 may also include structural features of the object 16, such as vertices, curves, surfaces, and volumes, as well as model information, among others. A vertex of the CAD model 14 may be a point where two or more lines, curves, or surfaces meet or intersect one another. A curve of the CAD model 14 may be a plurality of connected points which form an object that may be either arcuate or straight. A surface of the CAD model 14 may be a plurality of connected points which form an object that is planar, curved, or contoured. A volume of the CAD model 14 may be a body of one of the components of the CAD model 14. The model information may include data about the CAD model 14 not related to its structure.

Figure 4:
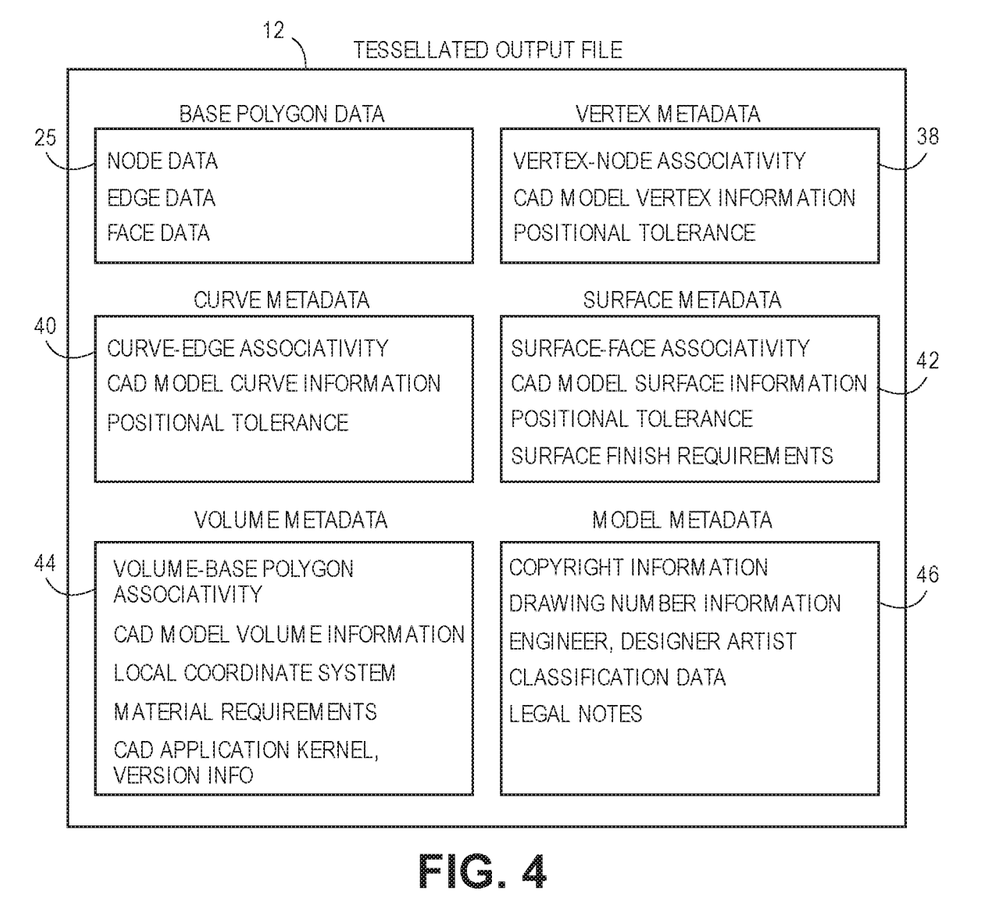
FIG. 4 is a listing of contents of the tessellated output file.

The processing element 24 parses the CAD model file to determine the features of the CAD model 14. The processing element 24 then creates a tessellated output file, the format of which is shown in FIG. 4, which includes data about the features of the CAD model 14 in a universal format that can be utilized by the AM machine 18 to create the object 16 as well as by any CAD software application to recreate the CAD model 14. The tessellated output file 12 includes base polygon data 25 and a plurality of metadata containers or bins.

The base polygon data 25, or tessellated geometry data, describes or defines the CAD model 14 in a mesh-based format suitable for additive manufacturing by the AM machine 18. The mesh 26 is formed by a plurality of polygons 28, or facets, that connect to one another (in a tessellated fashion) so as to represent and/or approximate the surfaces and contours of the CAD model 14. The polygons 28 may be embodied by any multi-sided object, such as quadrilaterals, pentagons, hexagons, octagons, etc., or combinations thereof. Each polygon 28 includes, and is defined by, a plurality of spaced-apart nodes 30, a plurality of edges 32 with each edge 32 connecting two nodes 30, and a face 34 occupying the area within the nodes 30 and edges 32. Thus, the base polygon data 25 includes a listing, a database, or a virtual database of node data, edge data, and face data. The processing element 24 may determine or choose the number of polygons 28 to represent the CAD model 14. In general, a greater number of polygons 28 may provide greater resolution, e.g., smoother surfaces, of the object 16 when it is created by the AM machine 18. One of the tradeoffs is that a greater number of polygons 28 may lead to, or result in, a larger tessellated output file 12. The number of polygons 28 determined by the processing element 24 may vary according to, or be set by, user selection or manufacturing parameters of the AM machine 18. Furthermore, the processing element 24 may determine or choose the locations, including coordinates such as (x, y, z), of the nodes 30 of each polygon 28—and in turn, the edges 32 and the face 34 of each polygon—such that one node 30 of one polygon 28 aligns with, is co-located with, or has the same coordinates as, one vertex of the CAD model 14, at least one edge 32 of at least one polygon 28 aligns, or is co-located, with one curve of the CAD model 14, and at least one face 34 of at least one polygon 28 aligns, or is co-located, with one surface of the CAD model 14. While there is one node 30 aligned with each vertex, there may be more nodes 30 than vertices.

Figure 5:
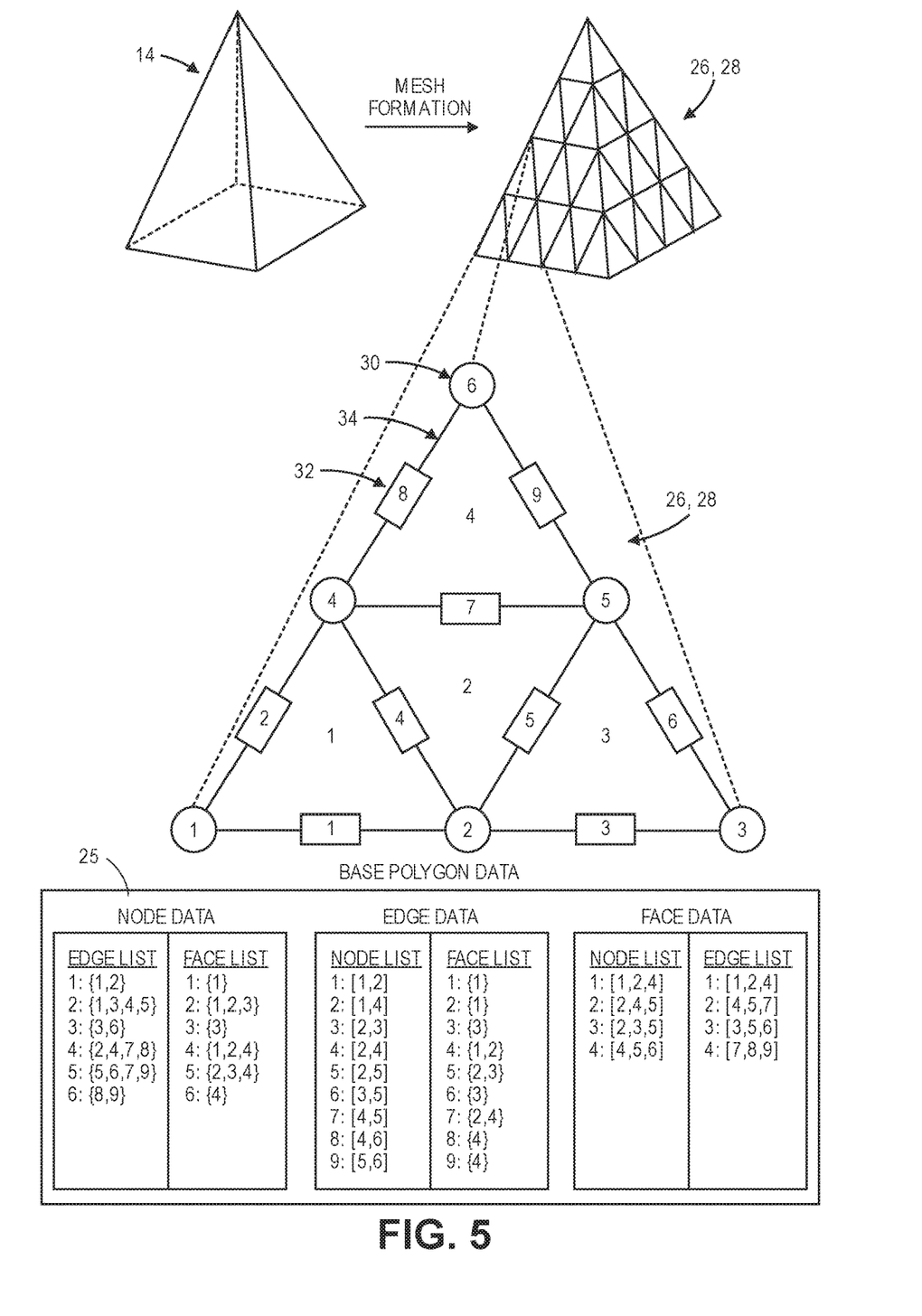
FIG. 5 is an illustration of a mesh formation process performed on the CAD model and a relationship to base polygon data from the tessellated output file.

An example of a graphic representation of the CAD model 14 and the mesh 26 created to represent the CAD model 14 are shown in FIG. 5. In this example, the object 16 that the CAD model 14 defines is a pyramid. Each polygon 28 used to create the mesh 26 is a triangle. A portion of the mesh 26 for one surface of the pyramid is enlarged to show six nodes 30, nine edges 32, and four faces 34 of the mesh 26. In this example, the processing element 24 determines the coordinates of node #1 to align with a vertex of the CAD model 14. The processing element 24 determines the coordinates of the other nodes 30 such that edges #1 and #3 align with one edge or curve of the CAD model 14, while edges #2 and #8 align with another edge or curve of the CAD model 14. Furthermore, the processing element 24 determines the coordinates of the other nodes 30 such that faces #1-#4 align with one of the surfaces of the CAD model 14.

The base polygon data 25 to accompany the mesh 26 is also shown in FIG. 5. Although not shown in FIG. 5 or the other figures, the processing element 24 also determines the coordinates for each node 30 and may associate the coordinate data with the base polygon data 25—particularly the node data. Two lists are created for each of the node data, the edge data, and the face data which link the nodes 30, the edges 32, and the faces 34, as appropriate. For the node data, there is an edge list and a face list. In the edge list, there is an entry for each node 30 that lists the edges 32 to which the node 30 is connected. In the face list, there is an entry for each node 30 that lists the faces 34 to which the node 30 is connected. For the edge data, there is a node list and a face list. In the node list, there is an entry for each edge 32 that lists the nodes 30 to which the edge 32 is connected. In the face list, there is an entry for each edge 32 that lists the faces 34 to which the edge 32 is connected. For the face data, there is a node list and an edge list. In the node list, there is an entry for each face 34 that lists the nodes 30 to which the face 34 is connected. In various embodiments, the nodes 30 are listed in an order that defines an outward direction relative to the face 34. For example, the nodes 30 may be listed in an order that follows the "right-hand rule" (as is widely known in physics) such that the nodes are listed in an order that goes counterclockwise around the perimeter of the polygon 28 associated with the face 34. Other rules or schemes are also possible. In the edge list, there is an entry for each face 34 that lists the edges 32 to which the face 34 is connected.

Figure 6:
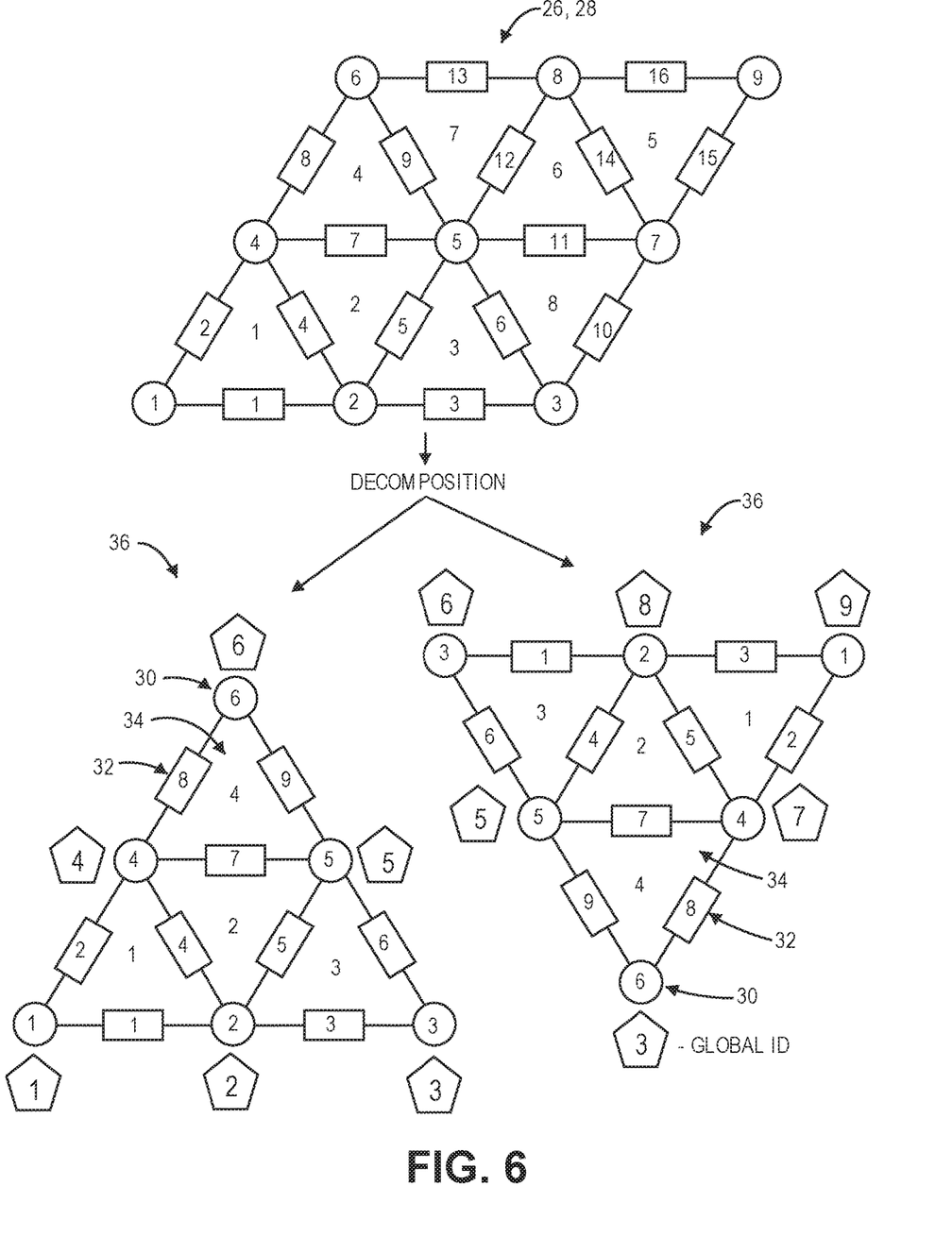
FIG. 6 is an illustration of a decomposition process performed on a portion of the mesh from FIG. 5.

In some situations, the tessellated output file 12 may be utilized for simulation or analysis purposes, such as in finite element analysis. In these situations, the mesh 26 for the entire CAD model 14 may be broken down or decomposed into smaller, perhaps uniform-sized, submeshes 36 that are easier to analyze, as illustrated in FIG. 6, wherein a portion of the overall mesh 26 is shown in the top half and two decomposed submeshes 36 are shown in the bottom half. The processing element 24 may generate the submeshes 36, for example, by dividing the overall mesh 26 into a plurality of submeshes 36, such that each submesh 36 includes an equivalent number nodes 30, edges 32, or faces 34. For example, each submesh 36 may include four faces 34 and the nodes 30 and edges 32 that form the faces 34. In order to maintain the original construction of the mesh 26, the processing element 24 may associate each original node 30 ID number, as a global ID, with the appropriate node 30 in the appropriate submesh 36. In some embodiments, the tessellated output file 12 may include a plurality of base polygon data 25 listings with one for each submesh 36. In other embodiments, the base polygon data 25 may include a plurality of node data groups—one for each submesh 36, a plurality of edge data groups—one for each submesh 36, and a plurality of face data groups—one for each submesh 36. And, each node data group may have a global ID associated with each local node 30.

The metadata containers list or include information related to the features of the CAD model 14 and associates the information with the base polygon data 25 and/or polygon 28 features. In various embodiments, the processing element 24 may create a vertex metadata container 38, a curve metadata container 40, a surface metadata container 42, a volume metadata container 44, and a model metadata container 46. In some embodiments, each metadata container may be partitioned, or separated, within the tessellated output file 12. In other embodiments, the data generated for each metadata contained may distributed throughout the tessellated output file 12.

The vertex metadata container 38 includes a listing of a plurality of entries—one entry for each vertex of the CAD model 14. As mentioned above, for each vertex, the processing element 24 generates one of the nodes 30 of one of the polygons 28 to have the same coordinates as the vertex and associates the node 30 with the vertex, such that a different one of the nodes 30 of the polygons 28 is linked to each of the vertices in the CAD model 14. Each entry of the listing may include an identifier of the vertex, an identifier of the associated node 30, and optionally, coordinates of the vertex. In addition, the entry may include positional tolerance information. In the CAD model 14, the coordinates may define the position of the vertex within a three-dimensional space. The positional tolerance may describe or define how much variation from its position is acceptable. For example, a positional tolerance for a given vertex may be (±0.1, ±0.1, ±0.01)—indicating that there is greater tolerance or variation of position of the vertex in the XY plane than there is in the Z dimension.

The curve metadata container 40 includes a listing of a plurality of entries—one entry for each curve of the CAD model 14. As mentioned above, the processing element 24 generates the coordinates of the nodes 30 of the polygons 28, and thus determines a location of each edge 32, such that the edges 32 formed by the nodes 30 align with the curves of the CAD model 14. That is, for each curve of the CAD model 14, there are one or more edges 32 that align with the curve in order to approximate or represent the shape of the curve. Each entry of the listing may include an identifier of the curve, identifiers of the one or more associated edges 32, directional information about the curve, and positional information of the curve, such as coordinates of a center of the curve, radius of curvature, etc. Furthermore, each entry may include a positional tolerance of the curve, which indicates the acceptable variation of the position of the center of the curve and its radius of curvature.

Figure 7:
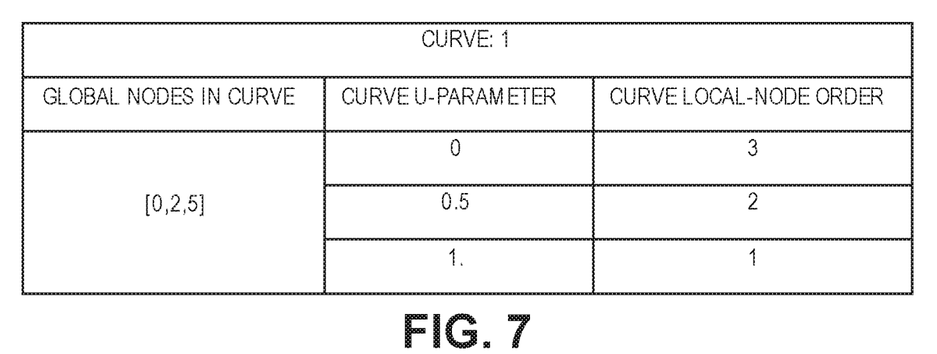
FIG. 7 is an illustration of a first embodiment of metadata for a CAD model curve that is included in the tessellated output file.
Figure 8:
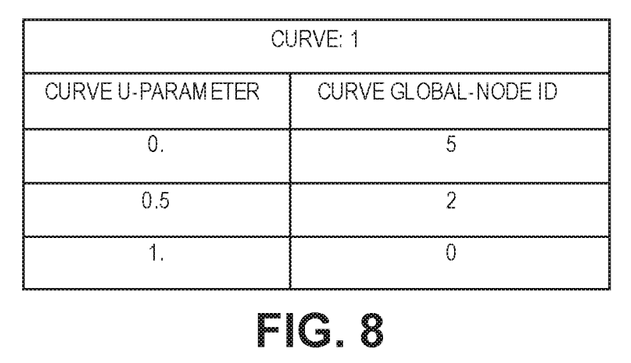
FIG. 8 is an illustration of a second embodiment of metadata for a CAD model curve that is included in the tessellated output file.

In addition, some curves, as they are defined in the CAD model 14, may have a parametric definition such that the curve's position or shape may be a function of other variables. For example, the (x, y, z) coordinates of some aspect of the curve, e.g., the center, may be a function of a variable, such as "t". These parametric values may also be known as "U-parameters", wherein the U-parameters include values of 0, 0.5, and 1, with a listing of a node 30 associated with each value. In some embodiments, the entry for each curve of the CAD model 14 may include three columns of data for the U-parameters, as shown in FIG. 7, with a first column including a listing of the nodes 30 associated with the curve, a second column including the U-parameter values, and a third column including an order of local nodes 30 forming the curve. In other embodiments, the entry for each curve of the CAD model 14 may include three columns of data for the U-parameters, as shown in FIG. 8, with a first column including the U-parameter values and a second column including the associated global nodes 30.

The surface metadata container 42 includes a listing of a plurality of entries—one entry for each surface of the CAD model 14. As mentioned above, the processing element 24 generates the coordinates of the nodes 30 of the polygons 28, and thus determines a location of each face 34, such that the faces 34 formed by the nodes 30 align with the surfaces of the CAD model 14. That is, for each surface of the CAD model 14, there are one or more faces 34 that align with the surface in order to approximate or represent the shape of the surface. Each entry of the listing may include an identifier of the surface, identifiers of the one or more associated faces 34, directional information about the surface, and positional information of the surface. Furthermore, each entry may include a positional tolerance of the surface. In addition, each entry may include information about a finish of the surface for at least a portion of the surfaces, a color, or other data specific to the surface.

The volume metadata container 44 includes a listing of the nodes 30 of the polygons 28 that form the volume of the CAD model 14. The volume metadata container 44 may also include information about the volume received from the CAD model 14. The volume metadata container 44 may further include information regarding the material from which the object 16 is formed. In addition, the volume metadata container 44 may include information regarding a local coordinate system which indicates the units of the CAD model 14. Furthermore, the volume metadata container 44 may include information the kernel and/or version of the CAD application which created the CAD model 14. The kernel may be identified by a name or ID code.

The model metadata container 46 includes data generally associated with the CAD model file and includes information such as a name of an engineer, a designer, or an artist who created the CAD model 14, a drawing number, copyright information, or other legal information or notes. The model metadata container 46 may further include information about whether the CAD model 14, or some aspects thereof, are confidential or classified with a certain security clearance required to have access to the CAD model 14.

Once the base polygon data 25 and all the metadata containers are generated, the processing element 24 generates the tessellated output file 12. The tessellated output file 12 may be generated as text, such as ASCII text, or may be encoded in binary data form. As shown in FIG. 1, the tessellated output file 12 may be sent to the AM machine 18 for creation of the object 16. The AM machine 18 may primarily utilize the base polygon data 25 in order to perform the 3D printing process, and may largely ignore the metadata container information. Additionally, or alternatively, as shown in FIG. 2, the computing device 10 may retrieve the tessellated output file 12, such as from a computer server 20. The computing device 10 may then recreate the CAD model 14, using either the original CAD software application or a different CAD software application. The CAD software application may rely on the combination of the base polygon data 25 and the information in the metadata containers. Furthermore, the tessellated output file 12 may be utilized to perform simulation or analysis on the structure formed by the base polygon data 25. Simulation or analysis software, such as finite element analysis, may decompose the overall mesh 26, as described above, or may utilize the base polygon data 25 in combination with the information from the metadata containers to simulate or analyze the CAD model 14 or the object 16.

Figure 9:
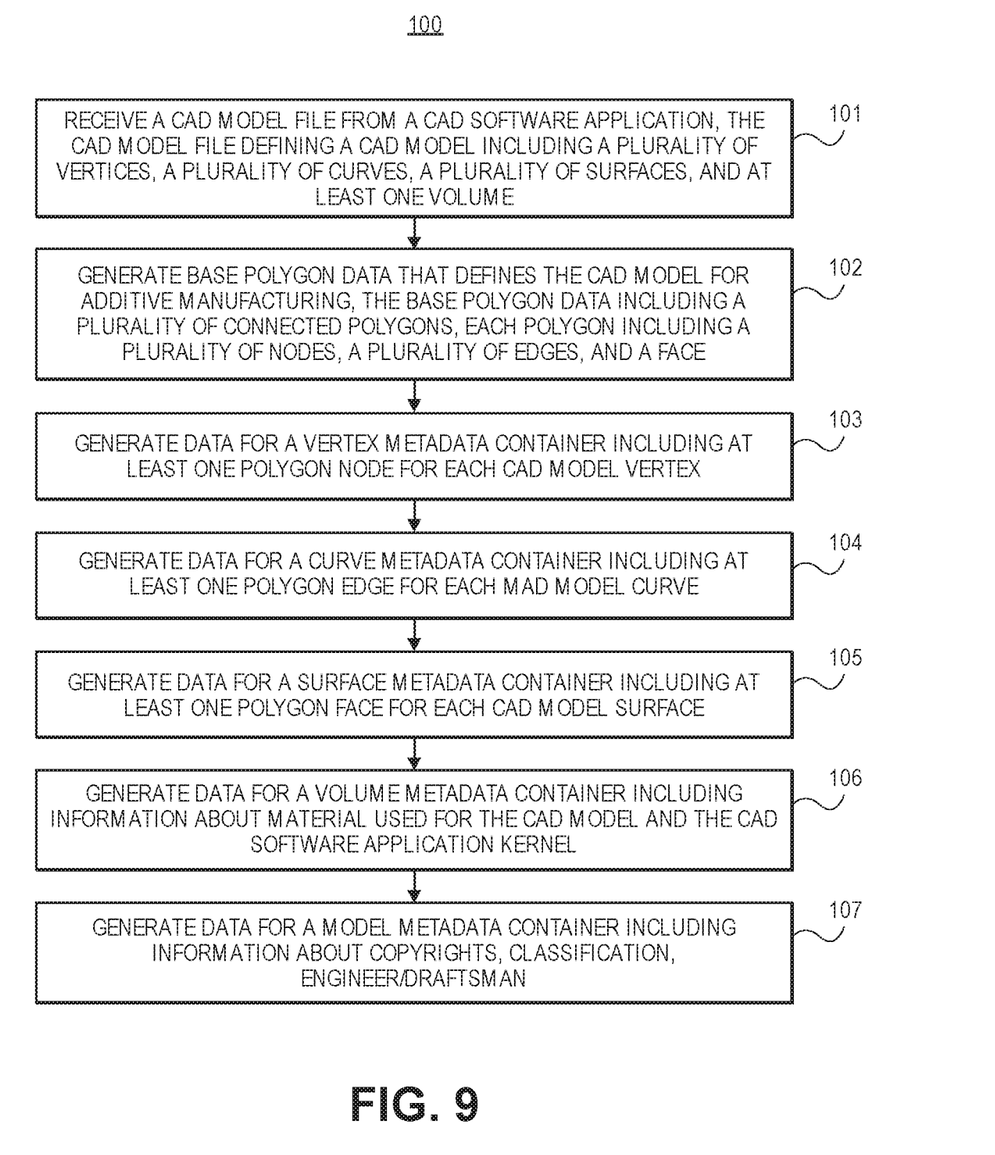
FIG. 9 is a listing of at least a portion of the steps of a method of generating a tessellated output file.

FIG. 9 depicts a listing of at least a portion of the steps of an exemplary computer-implemented method 100 for generating a computer-aided design (CAD) tessellated output file 12. The steps may be performed in the order shown in FIG. 9, or they may be performed in a different order. Furthermore, some steps may be performed concurrently as opposed to sequentially. In addition, some steps may be optional or may not be performed. Generally, the method 100 is performed by the processing element 24 of the computing device 10.

Referring to step 101, a CAD model file is received from a CAD software application. The CAD model file defines a CAD model 14, which may include information about the object 16, such as a shape, a size, dimensions, number and type of subcomponents, materials used to form the object 16, one or more colors of the object 16, surface finishes, and so forth. The CAD model 14 may also include structural features of the object 16, such as vertices, curves, surfaces, and volumes, as well as model information, among others.

Referring to step 102, base polygon data 25 is generated. The base polygon data 25, or tessellated geometry data, describes or defines the CAD model 14 in a mesh-based format suitable for additive manufacturing by the AM machine 18. The mesh 26 is formed by a plurality of polygons 28, or facets, that connect to one another (in a tessellated fashion) so as to represent and/or approximate the surfaces and contours of the CAD model 14. Each polygon 28 includes, and is defined by, a plurality of nodes 30, a plurality of edges 32, and a face 34. Thus, the base polygon data 25 includes a listing, a database, or a virtual database of node data, edge data, and face data. Furthermore, the processing element 24 may determine or choose the locations, including coordinates such as (x, y, z), of the nodes 30 of each polygon 28—and in turn, the edges 32 and the face 34 of each polygon—such that at least one node 30 of one polygon 28 aligns with, is co-located with, or has the same coordinates as one vertex of the CAD model 14, at least one edge 32 of one polygon 28 aligns, or is co-located, with one curve of the CAD model 14, and at least one face 34 of one polygon 28 aligns, or is co-located, with one surface of the CAD model 14.

The base polygon data 25 may further include two lists for each of the node data, the edge data, and the face data which link the nodes 30, the edges 32, and the faces 34, as appropriate. For the node data, there is an edge list and a face list. In the edge list, there is an entry for each node 30 that lists the edges 32 to which the node 30 is connected. In the face list, there is an entry for each node 30 that lists the faces 34 to which the node 30 is connected. For the edge data, there is a node list and a face list. In the node list, there is an entry for each edge 32 that lists the nodes 30 to which the edge 32 is connected. In the face list, there is an entry for each edge 32 that lists the faces 34 to which the edge 32 is connected. For the face data, there is a node list and an edge list. In the node list, there is an entry for each face 34 that lists the nodes 30 to which the face 34 is connected. In the edge list, there is an entry for each face 34 that lists the edges 32 to which the face 34 is connected.

Referring to step 103, data for a vertex metadata container 38 is generated. The vertex metadata container 38 includes a listing of a plurality of entries—one entry for each vertex of the CAD model 14. Each entry of the listing may include an identifier of the vertex, an identifier of the associated node 30, and optionally, coordinates of the vertex. In addition, the entry may include positional tolerance information.

Referring to step 104, data for a curve metadata container 40 is generated. The curve metadata container 40 includes a listing of a plurality of entries—one entry for each curve of the CAD model 14. Each entry of the listing may include an identifier of the curve, identifiers of the one or more associated edges 32, directional information about the curve, and positional information of the curve, such as coordinates of a center of the curve, radius of curvature, etc.

Referring to step 105, data for a surface metadata container 42 is generated. The surface metadata container 42 includes a listing of a plurality of entries—one entry for each surface of the CAD model 14. Each entry of the listing may include an identifier of the surface, identifiers of the one or more associated faces 34, directional information about the surface, and positional information of the surface. Furthermore, each entry may include a positional tolerance of the surface. In addition, each entry may include information about a finish of the surface for at least a portion of the surfaces, a color, or other data specific to the surface.

Referring to step 106, data for a volume metadata container 44 is generated. The volume metadata container 44 includes a listing of the nodes 30 of the polygons 28 that form the volume of the CAD model 14. The volume metadata container 44 may also include information about the volume received from the CAD model 14. The volume metadata container 44 may further include information regarding the material from which the object 16 is formed. In addition, the volume metadata container 44 may include information regarding a local coordinate system which indicates the units of the CAD model 14. Furthermore, the volume metadata container 44 may include information the kernel and/or version of the CAD application which created the CAD model 14. The kernel may be identified by a name or ID code.

Referring to step 107, data for a model metadata container 46 is generated. The model metadata container 46 includes data generally associated with the CAD model file and includes information such as a name of an engineer, a designer, or an artist who created the CAD model 14, a drawing number, copyright information, or other legal information or notes about the CAD model 14. The model metadata container 46 may further include information about whether the CAD model 14, or some aspects thereof, are confidential or classified with a certain security clearance required to have access to the CAD model 14.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer-implemented method of generating a tessellated output file that is communicated to an additive manufacturing machine which manufactures a part defined in the tessellated output file, the method comprising:
   receiving a computer-aided design (CAD) model file from a CAD software application, the CAD model file defining a CAD model including a plurality of vertices, a plurality of curves, a plurality of surfaces, and at least one volume;
   generating base polygon data that defines the CAD model for additive manufacturing, the base polygon data including a plurality of connected polygons, each polygon including a plurality of nodes, a plurality of edges with each edge of the plurality of edges connecting two nodes of the plurality of nodes, and a face bounded by the plurality of nodes and the plurality of edges;
   generating data for a vertex metadata container including a listing of CAD model vertices and one polygon node associated with each CAD model vertex;
   generating data for a curve metadata container including a listing of CAD model curves and at least one polygon edge associated with each CAD model curve;
   generating data for a surface metadata container including a listing of CAD model surfaces and at least one polygon face associated with each CAD model surface;
   incorporating the base polygon data, the data for the vertex metadata container, the data for the curve metadata container, and the data for the surface metadata container in the tessellated output file;
   communicating the tessellated output file to an additive manufacturing machine; and
   operating the additive manufacturing machine to manufacture a part based on the CAD model.

2. The computer-implemented method of claim 1, further comprising generating data for a volume metadata container including information about material used for the CAD model.

3. The computer-implemented method of claim 1, further comprising generating data for a volume metadata container including information the CAD software application kernel.

4. The computer-implemented method of claim 1, further comprising generating data for a model metadata container including legal information about the CAD model.

5. The computer-implemented method of claim 1, wherein the vertex metadata container, the curve metadata container, and the surface metadata container each include positional tolerance information.

6. The computer-implemented method of claim 1, wherein the curve metadata container includes finish requirement information for at least a portion of the surfaces.

7. The computer-implemented method of claim 1, wherein generating base polygon data further comprises generating three-dimensional coordinates of each node of each polygon, such that one of the nodes of one of the polygons has the same coordinates as each CAD model vertex.

8. The computer-implemented method of claim 1, wherein generating base polygon data further comprises generating three-dimensional coordinates of each node of each polygon and the location of each edge of each polygon, such that at least one of the edges of at least one of the polygons is co-located with each CAD model curve.

9. The computer-implemented method of claim 1, wherein generating base polygon data further comprises generating three-dimensional coordinates of each node of each polygon and the location of each face of each polygon, such that at least one of the faces of at least one of the polygons is co-located with each CAD model surface.

10. The computer-implemented method of claim 1, wherein generating base polygon data further comprises generating node data including
    an edge list with an entry for each node that lists the edges to which the node is connected, and
    a face list with an entry for each node that lists the faces to which the node is connected.

11. The computer-implemented method of claim 1, wherein generating base polygon data further comprises generating edge data including
    a node list with an entry for each edge that lists the nodes to which the edge is connected, and
    a face list with an entry for each edge that lists the faces to which the edge is connected.

12. The computer-implemented method of claim 1, wherein generating base polygon data further comprises generating face data including
    a node list with an entry for each face that lists the nodes to which the face is connected, and
    an edge list with an entry for each face that lists the edges to which the face is connected.

13. A computer-implemented method of generating a tessellated output file that is communicated to an additive manufacturing machine which manufactures a part defined in the tessellated output file, the method comprising:
receiving a computer-aided design (CAD) model file from a CAD software application, the CAD model file defining a CAD model including a plurality of vertices, a plurality of curves, a plurality of surfaces, and at least one volume;
generating base polygon data that defines the CAD model for additive manufacturing, the base polygon data including a plurality of connected polygons, each polygon including a plurality of nodes, a plurality of edges with each edge of the plurality of edges connecting two nodes of the plurality of nodes, and a face bounded by the plurality of nodes and the plurality of edges;
generating data for a vertex metadata container including a listing of CAD model vertices and one polygon node associated with each CAD model vertex;
generating data for a curve metadata container including a listing of CAD model curves and at least one polygon edge associated with each CAD model curve;
generating data for a surface metadata container including a listing of CAD model surfaces and at least one polygon face associated with each CAD model surface;
generating data for a volume metadata container including information about material used for the CAD model and the CAD software application kernel;
generating data for a model metadata container including legal information about the CAD model;
incorporating the base polygon data, the data for the vertex metadata container, the data for the curve metadata container, the data for the surface metadata container, the data for the volume metadata container, and the data for the model metadata container in the tessellated output file;
communicating the tessellated output file to the additive manufacturing machine; and
operating the additive manufacturing machine to manufacture the part based on the CAD model.

14. The computer-implemented method of claim 13, wherein generating base polygon data further comprises generating three-dimensional coordinates of each node of each polygon, such that one of the nodes of one of the polygons has the same coordinates as each CAD model vertex.

15. The computer-implemented method of claim 13, wherein generating base polygon data further comprises generating three-dimensional coordinates of each node of each polygon and the location of each edge of each polygon, such that at least one of the edges of at least one of the polygons is co-located with each CAD model curve.

16. The computer-implemented method of claim 13, wherein generating base polygon data further comprises generating three-dimensional coordinates of each node of each polygon and the location of each face of each polygon, such that at least one of the faces of at least one of the polygons is co-located with each CAD model surface.

17. The computer-implemented method of claim 13, wherein generating base polygon data further comprises generating node data including
an edge list with an entry for each node that lists the edges to which the node is connected, and
a face list with an entry for each node that lists the faces to which the node is connected.

18. The computer-implemented method of claim 13, wherein generating base polygon data further comprises generating edge data including
a node list with an entry for each edge that lists the nodes to which the edge is connected, and
a face list with an entry for each edge that lists the faces to which the edge is connected.

19. The computer-implemented method of claim 13, wherein generating base polygon data further comprises generating face data including
a node list with an entry for each face that lists the nodes to which the face is connected, and
an edge list with an entry for each face that lists the edges to which the face is connected.

20. A computer-implemented method of generating a tessellated output file that is communicated to an additive manufacturing machine which manufactures a part defined in the tessellated output file, the method comprising:
receiving a computer-aided design (CAD) model file from a CAD software application, the CAD model file defining a CAD model including a plurality of vertices, a plurality of curves, a plurality of surfaces, and at least one volume;
generating base polygon data that defines the CAD model for additive manufacturing, the base polygon data including a plurality of connected polygons, each polygon including a plurality of nodes, a plurality of edges with each edge of the plurality of edges connecting two nodes of the plurality of nodes, and a face bounded by the plurality of nodes and the plurality of edges;
generating node data associated with the base polygon data, the node data including an edge list and a face list;
generating edge data associated with the base polygon data, the edge data including a node list and a face list;
generating face data associated with the base polygon data, the face data including a node list and an edge list;
generating data for a vertex metadata container including a listing of CAD model vertices and one polygon node associated with each CAD model vertex;
generating data for a curve metadata container including a listing of CAD model curves and at least one polygon edge associated with each CAD model curve;
generating data for a surface metadata container including a listing of CAD model surfaces and at least one polygon face associated with each CAD model surface;
generating data for a volume metadata container including information about material used for the CAD model and the CAD software application kernel;
generating data for a model metadata container including legal information about the CAD model;
incorporating the node data, the edge data, the face data, the base polygon data, the data for the vertex metadata container, the data for the curve metadata container, the data for the surface metadata container, the data for the volume metadata container, and the data for the model metadata container in the tessellated output file;
communicating the tessellated output file to the additive manufacturing machine; and
operating the additive manufacturing machine to manufacture the part based on the CAD model.

* * * * *